United States Patent
Kusuura

(10) Patent No.: US 9,261,730 B2
(45) Date of Patent: Feb. 16, 2016

(54) DISPLAY DEVICES INCLUDING INORGANIC COMPONENTS AND METHODS OF MAKING AND USING THE SAME

(71) Applicant: Empire Technology Development LLC, Wilmington, DE (US)

(72) Inventor: Takahisa Kusuura, Kanagawa (JP)

(73) Assignee: Empire Technology Development LLC, Wilmington, DE (US)

( * ) Notice: Subject to any disclaimer, the term of this patent is extended or adjusted under 35 U.S.C. 154(b) by 387 days.

(21) Appl. No.: 14/004,653

(22) PCT Filed: Jan. 3, 2013

(86) PCT No.: PCT/US2013/020134
§ 371 (c)(1),
(2) Date: Sep. 11, 2013

(87) PCT Pub. No.: WO2014/107153
PCT Pub. Date: Jul. 10, 2014

(65) Prior Publication Data
US 2014/0184987 A1 Jul. 3, 2014

(51) Int. Cl.
*G02F 1/1335* (2006.01)

(52) U.S. Cl.
CPC ...... *G02F 1/133602* (2013.01); *G02F 2201/44* (2013.01)

(58) Field of Classification Search
CPC .......... G02F 1/133602; G02F 2201/44; H05B 33/10
USPC .................... 349/67, 69; 313/498; 445/24, 23
See application file for complete search history.

(56) References Cited

U.S. PATENT DOCUMENTS

| 2,982,178 | A | | 5/1961 | Marks |
| 4,177,487 | A | * | 12/1979 | Takenouchi et al. .......... 358/474 |
| 4,486,213 | A | | 12/1984 | Lentz et al. |
| 4,500,173 | A | * | 2/1985 | Leibowitz et al. .............. 349/69 |
| 6,927,087 | B2 | | 8/2005 | Lai |
| 7,106,507 | B2 | | 9/2006 | Lee et al. |
| 7,517,735 | B2 | | 4/2009 | Yoshimoto et al. |
| 7,710,649 | B2 | | 5/2010 | Feng et al. |
| 7,871,838 | B2 | | 1/2011 | Moon et al. |

(Continued)

FOREIGN PATENT DOCUMENTS

| CN | 101688938 A | 3/2010 |
| CN | 102549482 A | 7/2012 |

(Continued)

OTHER PUBLICATIONS

Drost et al., Full-range Colored Metal Nanoparticle/Glass Polarizers for LCD Applications, 2005.

(Continued)

*Primary Examiner* — Sang V Nguyen
(74) *Attorney, Agent, or Firm* — Knobbe, Martens, Olson & Bear, LLP

(57) ABSTRACT

Display devices and composites for making display devices are disclosed. Some embodiments include a display device having an inorganic electroluminescent layer, an active matrix layer, an inorganic polarizing layer, a liquid crystal layer, and a color filtering layer. Some embodiments include a composite having an inorganic polarizing layer and inorganic electroluminescent layer. Methods of making and using the display device and composite are also disclosed.

13 Claims, 3 Drawing Sheets

(56) References Cited

U.S. PATENT DOCUMENTS

| | | | |
|---|---|---|---|
| 2003/0142244 A1* | 7/2003 | Kato | G02F 1/133553 349/61 |
| 2005/0136574 A1 | 6/2005 | Shih | |
| 2005/0243447 A1 | 11/2005 | Lee et al. | |
| 2006/0132671 A1* | 6/2006 | Koma | 349/63 |
| 2007/0047214 A1 | 3/2007 | Nesterenko et al. | |
| 2007/0177086 A1* | 8/2007 | Ishitani et al. | 349/117 |
| 2008/0006833 A1 | 1/2008 | Hirakata | |
| 2009/0027603 A1 | 1/2009 | Samulski et al. | |
| 2009/0046222 A1* | 2/2009 | Miner | G02F 1/133602 349/69 |
| 2009/0079909 A1* | 3/2009 | Ouderkirk et al. | 349/67 |
| 2009/0195152 A1* | 8/2009 | Sawano | 313/504 |
| 2011/0140130 A1 | 6/2011 | Chen et al. | |
| 2012/0057106 A1 | 3/2012 | Park et al. | |
| 2012/0068620 A1* | 3/2012 | Ishimura | 315/291 |
| 2012/0086887 A1* | 4/2012 | Lee | G02B 5/3058 349/62 |
| 2012/0287297 A1* | 11/2012 | Fukuda | 348/222.1 |

FOREIGN PATENT DOCUMENTS

| | | |
|---|---|---|
| EP | 1945718 A1 | 7/2008 |
| JP | 2005339924 A | 12/2005 |
| JP | 2008010416 A | 1/2008 |
| JP | 2008101176 | 5/2008 |
| JP | 2009059409 A | 3/2009 |
| JP | 2009276657 A | 11/2009 |
| JP | 2009298902 A | 12/2009 |
| JP | 20104442760 B2 | 3/2010 |
| JP | 2011059370 A | 3/2011 |
| TW | 201141308 A | 11/2011 |
| TW | 201227072 A | 7/2012 |
| TW | 201234084 A | 8/2012 |
| TW | 2012 40183 A | 10/2012 |

OTHER PUBLICATIONS

Jeol, "Electron Gun for Electron-Beam Deposition—Comparison of Film Forming Methods and Structure of Electron Gun," Web page of JEOL, Ltd. (downloaded on Jul. 26, 2012).

Gryczynski et al., Depolarized Light Scattering From Silver Nanoparticles, Chemical Physics Letters 421, 2006, pp. 189-192.

Gurski et al., Display Technology Overview, Lytica White Paper, Jul. 1, 2005.

Kirimura, The Development of Low Temperature Formation of Polycrystalline Silicon Thin Films, Nissin Electric Review, Mar. 2003, vol. 48, No. 1, pp. 9-14.

Matsumoto et al., Development of the Resist Coating System for Color-Filter Manufacturing Process, New STI Technology, Inc., Sumitomo Chemical Co., Ltd. 2002-II (downloaded on Jul. 26, 2012).

Murata et al., Reflection Characteristics of Cr Alloy Films by Sputtering Method, Metallurgical Research Laboratory, Hitachi Metals Ltd., Journal of the Surface Finishing Society of Japan, 2009, vol. 60, No. 1, pp. 63-65.

Oishi et al., Sputtering Machine for TFTs for Large Substrates, and Cathodes Thereof, Ulvac Technical Journal, 2006, No. 64, pp. 23-27.

Okada et al., Reflective-Type Plastic Color TFT-LCD, Sharp Technical Journal No. 85, pp. 30-33, Apr. 2003.

Rea, Multilayer Polarizer Panels, Lighting Answers, vol. 1, No. 2, pp. 1-6, Aug. 1993.

Riken News, "Researcher who created a nanoscale 'seal'," May 2007, No. 311.

Takao, "Inorganic EL device of T. Chatani and Kuraray has a life of 25,000 hours at 350,000 $cd/m^2$," EE Times Japan, Oct. 19, 2005.

Valtech, For Metal and Light (downloaded on Jul. 26, 2012).

International Search Report and Written Opinion dated Feb. 25, 2013 of International Patent Application No. PCT/US2013/020134, filed Jan. 3, 2013.

* cited by examiner

DISPLAY DEVICES INCLUDING INORGANIC COMPONENTS AND METHODS OF MAKING AND USING THE SAME

CROSS-REFERENCE TO RELATED APPLICATIONS

This application is the U.S. National Phase under 35 U.S.C. §371 of International Application No. PCT/US2013/020134, entitled DISPLAY DEVICES INCLUDING INORGANIC COMPONENTS AND METHODS OF MAKING AND USING THE SAME, filed Jan. 3, 2013. The content of this application is herein incorporated by reference in its entirety.

BACKGROUND

Liquid crystal displays can include a liquid crystal cell, conductive electrodes and polarizing layers. The conductive electrodes can include a thin film transistor layer (or TFT layer) to provide an active matrix display. A backlight can provide lighting for the liquid crystal panel to selectively transmit. The backlight can be, for example, an organic electroluminescent device.

Liquid crystal displays can be prepared by forming an organic electroluminescent device on a lower glass substrate and the TFT layer on an upper glass substrate. The separate substrates can be combined with the other components to form the liquid crystal display. As another example, the organic electroluminescent display is formed on the outer side of a glass substrate of a liquid crystal display after a TFT layer has been formed.

SUMMARY

Some embodiments disclosed herein include a display device.

Some embodiments disclosed herein include a display device including: an inorganic electroluminescent layer configured to emit visible light; an active matrix layer; an inorganic polarizing layer disposed between the inorganic electroluminescent layer and the active matrix layer; a liquid crystal layer, wherein the active matrix layer is disposed between the liquid crystal layer and the inorganic polarizing layer; and a color filtering layer.

Some embodiments disclosed herein include a composite including: an inorganic electroluminescent layer configured to emit visible light; and an inorganic polarizing layer configured to receive light emitted from the inorganic electroluminescent layer, wherein the inorganic polarizing layer comprises aligned metallic wires within an inorganic transparent matrix, the aligned metallic wires having a spacing that is effective to polarize light emitted from the inorganic electroluminescent layer.

Some embodiments disclosed herein include a method of making a display device. The method can include providing a composite. The composite can include an inorganic electroluminescent layer configured to emit visible light; and an inorganic polarizing layer configured to receive light emitted from the inorganic electroluminescent layer, wherein the inorganic polarizing layer comprises aligned metallic wires within an inorganic transparent matrix, the aligned metallic wires having a spacing that is effective to polarize light emitted from the inorganic electroluminescent layer. The method may further include forming an active matrix layer on the composite; disposing a liquid crystal layer between the composite and a second polarizing layer.

Some embodiments include a method of making a composite. The method can include: forming an inorganic electroluminescent layer on an inorganic substrate; and forming an inorganic polarizing layer on the inorganic electroluminescent layer, wherein the inorganic polarizing layer comprises aligned metallic wires within an inorganic transparent matrix, the aligned metallic wires having a spacing that is effective to polarize light emitted from the inorganic electroluminescent layer.

Some embodiments disclosed herein include a method of making a composite. The method can include: forming an inorganic polarizing layer on an inorganic transparent substrate, wherein the inorganic polarizing layer comprises aligned metallic wires within an inorganic transparent matrix; and forming an inorganic electroluminescent layer on the inorganic polarizing layer, wherein the aligned metallic wires have a spacing that is effective to polarize light emitted from the inorganic electroluminescent layer.

Some embodiments disclosed herein include a method of making a composite. The method can include: forming an inorganic polarizing layer on a first side of an inorganic transparent substrate, wherein the inorganic polarizing layer comprises aligned metallic wires within an inorganic transparent matrix, and wherein the aligned metallic wires have a spacing that is effective to polarize light emitted from the inorganic electroluminescent layer; and forming an inorganic electroluminescent layer on a second side of the inorganic transparent substrate.

Some embodiments disclosed herein include a method of using a display device. The method can include providing the display device. The display device can include an inorganic electroluminescent layer configured to emit visible light; an active matrix layer; an inorganic polarizing layer disposed between the inorganic electroluminescent layer and the active matrix layer; a liquid crystal layer, wherein the active matrix layer is disposed between the liquid crystal layer and the inorganic polarizing layer; and a color filtering layer. The method can further include applying a voltage to the inorganic electroluminescent layer effective to provide light to the liquid crystal layer.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
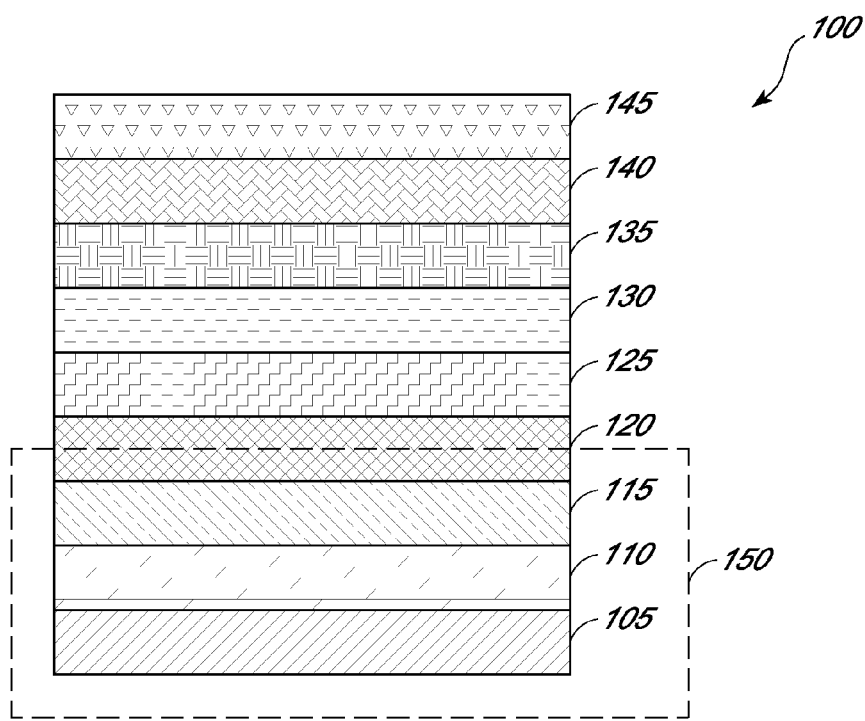
FIG. 1 is a schematic diagram showing one example of a display device that is within the scope of the present application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Some embodiments disclosed herein include a display device. FIG. 1 is a schematic diagram showing one example of a display device that is within the scope of the present application. Display device 100 includes inorganic electroluminescent layer 110 disposed between first inorganic substrate 105 and inorganic polarizing layer 115. Active matrix layer 120 is disposed between inorganic polarizing layer 115 and liquid crystal layer 125. Transparent electrode layer 130 is disposed between liquid crystal layer 125 and second polarizing layer 135. Color filtering layer 140 is disposed between second transparent substrate 145 and second polarizing layer 135.

First inorganic substrate 105 is not particularly limited, and can generally be any inorganic substrate suitable for forming inorganic electroluminescent layer 110, inorganic polarizing layer 115, and active matrix layer 120 thereon. In some embodiments, the substrate can be a ceramic, such as glass. The substrate can be transparent or opaque. The substrate may have a light transmittance for visible light of, for example, at least about 50%, at least about 70%, or at least about 90%. The substrate may have a light transmittance for visible light of, for example, no more than 90%, no more than 70%, no more than 50%, no more than 30%, or no more than 20%.

Inorganic electroluminescent layer 110 is disposed between first inorganic substrate 105 and inorganic polarizing layer 115. The inorganic electroluminescent layer can generally be any inorganic electroluminescent layer that is configured to emit visible light. The inorganic electroluminescent layer can be either AC- or DC-driven. In some embodiments, the inorganic electroluminescent layer can be configured to be DC-driven at a voltage of about 0.1 V to about 20 V. In some embodiments, the inorganic electroluminescent layer includes an inorganic phosphor layer having one or more inorganic phosphors. Non-limiting examples of inorganic phosphors include ZnS, ZnSe, ZnSSe, SrS, CaS, SrSe, or SrSeS. The inorganic phosphor may be doped. Japanese Patent Application Publication Number 2009-298902 suggests non-limiting examples of inorganic phosphor materials that may be used in the inorganic phosphor layer. In some embodiments, two or more inorganic phosphors can be used in the inorganic phosphor layer. The inorganic phosphor layer may, for example, have a thickness of about 100 nm to about 50 μm.

The inorganic electroluminescent layer may, in some embodiments, include one or more electrodes configured to illuminate the inorganic phosphor layer by applying a voltage. In some embodiments, the inorganic electroluminescent layer includes a first electrode, where the inorganic phosphor layer is disposed between the first electrode and the liquid crystal layer (e.g., liquid crystal layer 125). The first electrode may be transparent, reflective, or opaque. For example, the first electrode can be a transparent electrode, such as an indium tin oxide (ITO) electrode. As another example, the first electrode can include a reflective, conductive material, such as Al, Ag, Cr, Mo, and alloys thereof. A reflective electrode may, in some embodiments, advantageously reflect light emitted from the inorganic phosphor layer towards the liquid crystal layer. In some embodiments, the first electrode is metallic.

In some embodiments, the inorganic electroluminescent layer includes a second electrode, where the second electrode is disposed between the inorganic phosphor layer and the liquid crystal layer. The second electrode may, for example, be configured to transmit light emitted from the inorganic phosphor layer to the liquid crystal layer. The substrate may have a light transmittance for visible light of, for example, at least about 50%, at least about 70%, or at least about 90%. As an example, the second electrode may include a metallic mesh so that at least a portion of the light transmits through gaps in the mesh. The mesh may optionally be embedded in an inorganic transparent matrix (e.g., silica). In some embodiments, the second electrode is transparent. For example, the second electrode can include indium tin oxide (ITO). In some embodiments, the second electrode includes a ceramic. In some embodiments, the second electrode includes a metal.

The inorganic electroluminescent layer may optionally include a p-type semiconductor layer disposed between the second electrode and the inorganic phosphor layer. The p-type semiconductor layer may include, for example, $Cu_2S$. In some embodiments, the p-type semiconductor layer is transparent. In embodiments without the second electrode (e.g., the inorganic polarizing layer functions as an electrode to illuminate the inorganic phosphor), a p-type semiconductor layer may optionally be disposed between the inorganic phosphor layer and the inorganic polarizing layer.

As a non-limiting example, the inorganic electroluminescent layer can include a reflective electrode (e.g., a chromium-based electrode), an inorganic phosphor layer (e.g., ZnS), a p-type semiconductor layer (e.g., $Cu_2S$), and a transparent electrode (e.g., an ITO electrode), where (i) the inorganic phosphor layer is disposed between the reflective electrode and the p-type semiconductor layer and (ii) the p-type semiconductor layer is disposed between the inorganic phosphor layer and the transparent electrode.

As another non-limiting example, the inorganic electroluminescent layer can include a reflective electrode (e.g., a chromium-based electrode), an inorganic phosphor layer (e.g., ZnS), a p-type semiconductor layer (e.g., $Cu_2S$), and a metallic mesh electrode (e.g., Au, Ag, or Al mesh), where (i) the inorganic phosphor layer is disposed between the reflective electrode and the p-type semiconductor layer and (ii) the p-type semiconductor layer is disposed between the inorganic phosphor layer and the metallic mesh electrode.

Returning to FIG. 1, inorganic polarizing layer 115 is disposed between inorganic electroluminescent layer 110 and active matrix layer 120. The inorganic polarizing layer is not particularly limited, and can be configured to polarize light emitted from the inorganic electroluminescent layer. In some embodiments, the inorganic polarizing layer includes aligned metallic wires within an inorganic matrix. The aligned metallic wires having a spacing effective to polarize light emitted from the in organic electroluminescent layer. For example, the spacing may be less than about 400 nm, or less than about 300 nm. The aligned metallic wires may include, for example, Al, Cr, and alloys thereof. In some embodiments, the inorganic matrix is a ceramic, such as silica.

In some embodiments, the inorganic polarizing layer includes aligned conductive phases within an inorganic matrix. For example, the inorganic polarizing layer can be aligned carbon nanotubes within a transparent ceramic, such as silica. U.S. Pat. No. 7,710,649 suggests methods of aligning carbon nanotubes on a transparent substrate to obtain a polarizing layer. These methods may similarly be used to obtain an inorganic polarizing layer. As another example, metal spheroids can be aligned within a transparent ceramic to obtain an inorganic polarizing layer. U.S. Pat. No. 4,486,213 suggests an inorganic polarizing layer including aligned silver spheroids in glass which may be used.

In some embodiments, the inorganic polarizing layer is a multi-layered laminate. As a non-limiting example, U.S. Pat. No. 2,982,178 suggests multi-layered laminates configured to polarize light that may be used.

Active matrix layer 120 is disposed between liquid crystal layer 125 and inorganic polarizing layer 115. The active matrix layer may be any known active matrix layer. For example, the active matrix layer can be a thin film transistor layer or a thin film diode layer. The thin film transistor layer may include gate lines and data lines formed to intersect at pixel electrodes. The active matrix layer may include, for example, at least about 1000 or at least about 1 million pixels. The number of pixels may be suitable for standard definition or high definition displays.

Liquid crystal layer 125 can be disposed between transparent electrode layer 130 and active matrix layer 120. Generally, any known liquid crystal layer can be used. In some embodiments, the liquid crystal layer includes liquid crystal molecules disposed between a first alignment layer and a second alignment layer. The liquid crystal molecules can be, for example, twisted nematic liquid crystals, such as cyanobiphenyls. The liquid crystal layer may also include spacer elements.

Transparent electrode layer 130 is disposed between liquid crystal layer 125 and second polarizing layer 135. The transparent electrode layer is not particularly limited, and may be, for example, an ITO electrode layer. The transparent electrode layer and the active matrix layer may be together configured to adjust a voltage applied to the liquid crystal layer. The adjusted voltage may change an amount of light transmitted through portions of the liquid crystal layer.

Second polarizing layer 135 is disposed between color filtering layer 140 and transparent electrode layer 130. The second polarizing layer is not particularly limited, and generally any known polarizing layer may be used. In some embodiments, the second polarizing layer can be the same as the inorganic polarizing layer (e.g., second polarizing layer 135 is the same as inorganic polarizing layer 115). The second polarizing layer may also, for example, be oriented polyvinyl alcohol (PVA) doped with iodine, or a wire-grid polarizer. As an example, U.S. Patent Publication No. 2012/0086887 suggests wire-grid polarizers suitable for liquid crystal displays.

Color filtering layer 140 can be disposed between second transparent substrate 145 and second polarizing layer 135. The color filtering layer can include a pattern of color filtering elements within a black matrix configured to prevent light from leaking between color filtering elements. By selectively directing light to different color filtering elements, the color of light transmitted through the display device can be adjusted. Although the color filtering layer is shown disposed between the second transparent substrate and the second polarizing layer, the skilled artisan, guided by the teachings of the present application, will appreciate that the color filtering layer can disposed in different regions of the display device. The color filtering layer may, in some embodiments, be configured to receive light emitted from the inorganic electroluminescent layer. Thus, for example, the color filtering layer may be disposed at any location between the second transparent substrate and the inorganic electroluminescent layer. As a specific, non-limiting example, the color filtering layer may be disposed between the liquid crystal layer and the second polarizing layer.

Second transparent substrate 145 is not particularly limited, and can generally be any transparent substrate that transmits visible light. For example, the second transparent substrate can be glass.

Inorganic polarizing layer 115, inorganic electroluminescent layer 110, and first inorganic substrate 105 may together form composite 150. The composite may, in some embodiments, be pre-formed prior to assembling the display device. Thus, the composite may be amenable to forming an active matrix layer on the composite. Although the composite is shown as having three layers, the skilled artisan, guided by the teachings of the present application, will appreciate that additional layers can also be included in the composite. For example, as will be discussed further below, the composite may also include a scattering layer and/or reflective layer.

Figure 2:
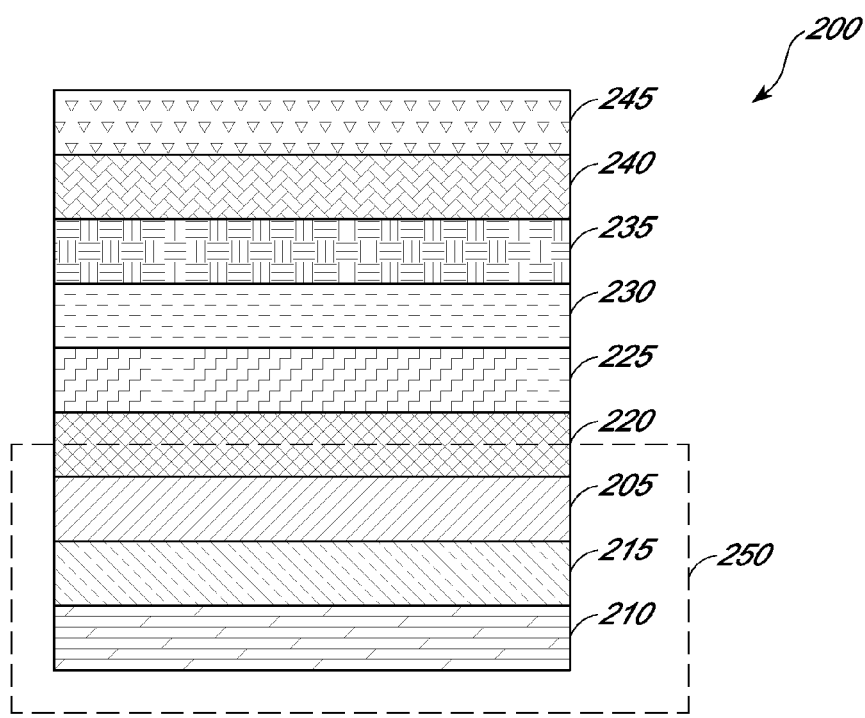
FIG. 2 is a schematic diagram showing one example of a display device that is within the scope of the present application.

FIG. 2 is a schematic diagram showing one example of a display device that is within the scope of the present application. Display device 200 generally includes the same components as display device 100, and therefore components 205-245 in display device 200 correspond to components 105-145 in display device 100, respectively. For example, inorganic polarizing layer 215 can have the same characteristics as inorganic polarizing layer 115 discussed above. Display device 200 includes inorganic polarizing layer 215 disposed between inorganic substrate 205 and inorganic electroluminescent layer 210. Inorganic electroluminescent layer 210 can be configured to emit visible light that is polarized by inorganic polarizing layer 215 and then transmitted through inorganic substrate 205. Inorganic substrate 205 may therefore be transparent, such as a suitable glass substrate.

Inorganic polarizing layer 215, inorganic electroluminescent layer 210, and inorganic substrate 205 may together form composite 250. The composite may, in some embodiments, be pre-formed prior to assembling the display device. Thus, the composite may be amenable to forming an active matrix layer on the composite. Although the composite is shown as having three layers, the skilled artisan, guided by the teachings of the present application, will appreciate that additional layers can also be included in the composite. For example, as will be discussed further below, the composite may also include a scattering layer and/or a reflecting layer.

Figure 3:
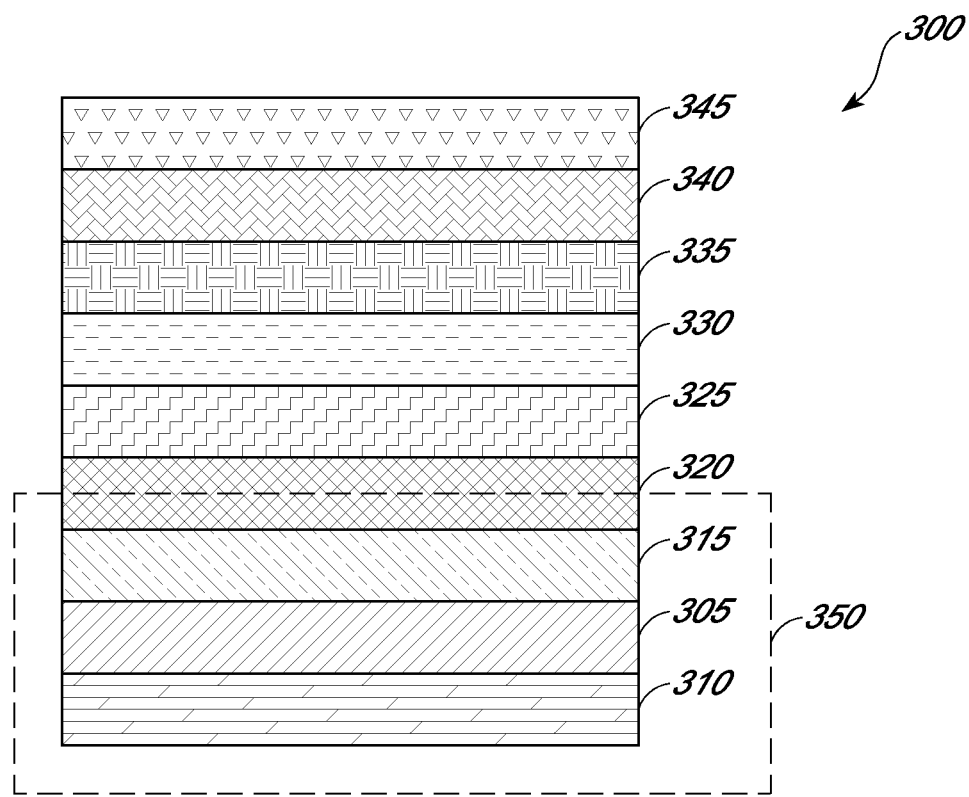
FIG. 3 is a schematic diagram showing one example of a display device that is within the scope of the present application.

FIG. 3 is a schematic diagram showing one example of a display device that is within the scope of the present application. Display device 300 generally includes the same components as display device 300, and therefore components 305-345 in display device 300 correspond to components 105-145 in display device 100, respectively. For example, inorganic electroluminescent layer 310 can have the same characteristics as inorganic electroluminescent layer 110 discussed above. Display device 300 includes inorganic substrate 305 disposed between inorganic polarizing layer 315 and inorganic electroluminescent layer 310. Inorganic electroluminescent layer 310 can be configured to emit visible light that is transmitted through inorganic substrate 305 and then polarized by inorganic polarizing layer 315. Inorganic substrate 305 may therefore be transparent, such as a suitable glass substrate.

Inorganic polarizing layer 315, inorganic electroluminescent layer 310, and inorganic substrate 305 together form composite 350. The composite may, in some embodiments, be pre-formed prior to assembling the display device. Thus, the composite may be amenable to forming an active matrix layer on the composite. Although the composite is shown as having three layers, the skilled artisan, guided by the teachings of the present application, will appreciate that additional layers can also be included in the composite. For example, as will be discussed further below, the composite may also include a scattering layer and/or reflective layer.

The display device (e.g., display device 100, display device 200, or display device 300 depicted in FIGS. 1-3, respectively) may optionally include a scattering layer. The scattering layer may be disposed between the inorganic electroluminescent layer and the inorganic polarizing layer. For example, the scattering layer may be disposed between inorganic electroluminescent layer 310 and inorganic substrate 305 in display device 300. As another example, the scattering layer may be disposed between inorganic polarizing layer 315 and inorganic substrate 305 in display device 300. As still another example, the scattering layer may be disposed between inorganic electroluminescent layer 110 and inorganic polarizing layer 115 in display device 100.

The scattering layer may, in some embodiments, include scattering elements dispersed within an inorganic matrix. For example, the scattering element may be air voids dispersed in a silica matrix. In some embodiments, the scattering elements are inorganic particles, such as metallic nanoparticles. The scattering element may, in some embodiments, have a varying size distribution to obtain sufficient scattering properties (e.g., a variance of at least about 100 nm, or at least about 400 nm). Silver nanoparticles can be used as scattering elements, such as those disclosed suggested in Chem. Phys. Letts. 421: 189-192 (2006).

The scattering layer may, in some embodiments, include inorganic birefringent particles. Non-limiting examples of birefringent particles include SiC, BeO, $Al_2O_3$, $TiO_2$, $SnO_2$, ZnS, PbS, $As_2Se_3$, $LiNbO_3$, $BaTiO_3$, $MgF_2$, and $KH_2PO_4$. The use of birefringent materials is further suggested in European Patent No. 1945718.

Without being bound to any particular theory, it is believed that a portion of light from the inorganic electroluminescent layer can be reflected by the inorganic polarizing layer, and the scattering layer may serve to redirect the reflected light toward the inorganic polarizing layer. Thus, the scattering layer may improve the amount of light that transmits through the inorganic polarizing layer, which can result in greater luminance for the display device.

The display device may also optionally include a reflective layer. The reflective layer can be configured to reflect light emitted from the inorganic electroluminescent layer towards the liquid crystal layer. For example, the inorganic electroluminescent layer can be disposed between the reflective layer and the liquid crystal layer. Thus, the reflective layer can improve an amount of light transmitted to the liquid crystal layer and therefore improve luminance for the display device.

The reflective layer may be metallic. For example, the reflective layer may include Al, Ag, Cr, Mo, or alloys thereof.

As discussed above, the inorganic electroluminescent layer can include a first electrode that is reflective. Thus, the reflective layer is optional. In some embodiments, the first electrode in the inorganic electroluminescent layer is disposed between the inorganic phosphor layer in the inorganic electroluminescent layer and the reflective layer, where the first electrode is transparent.

Some embodiments disclosed herein include a method of using a display device. The method can include providing a display device. The display device can be, in some embodiments, any of the display devices disclosed in the present application. For example the display device can be display device 100 as depicted in FIG. 1. In some embodiments, the display device includes: an inorganic electroluminescent layer configured to emit visible light; an active matrix layer; an inorganic polarizing layer disposed between the inorganic electroluminescent layer and the active matrix layer; a liquid crystal layer, where the active matrix layer is disposed between the liquid crystal layer and the inorganic polarizing layer; and a color filtering layer.

The method may also include applying a voltage to the inorganic electroluminescent layer effective to provide light to the liquid crystal layer. For example, a voltage can be applied between a first electrode and a second electrode in the inorganic electroluminescent layer that is effective for an inorganic phosphor layer between the electrodes to emit visible light.

The method may include, in some embodiments, adjusting a voltage applied to regions of the active matrix layer to modulate an amount of light from the inorganic electroluminescent layer transmitted through the display device. The skilled artisan, guided by the teaching of the present application, will appreciate that changing the voltage in regions of the active matrix layer can locally reorient liquid crystal molecules in the liquid crystal layer. The reorientation of the liquid crystal molecules can alter the orientation that light is polarized when transmitted through the liquid crystal layer. This will, in turn, affect an amount of light transmitted through the second polarizing layer.

Some embodiments disclosed herein include a composite. The composite may, in some embodiments, advantageously provide a pre-formed component for assembling a display device. In some embodiments, an active matrix layer can be formed on one side of the composite during a process for making the display device.

The composite may include an inorganic electroluminescent layer (e.g., inorganic electroluminescent layer 110 as depicted in FIG. 1) configured to emit visible light and an inorganic polarizing layer (e.g., inorganic polarizing layer 115 as depicted in FIG. 1) configured to receive light emitted from the inorganic electroluminescent layer. Non-limiting examples of composites include composite 150, composite 250, and composite 350 as depicted in FIGS. 1-3, respectively.

The inorganic electroluminescent layer in the composite can have the same characteristics as the inorganic electroluminescent layer in the display device described above. For example, the inorganic electroluminescent layer may include a reflective electrode, an inorganic phosphor layer, a p-type semiconductor layer, and a transparent electrode.

The inorganic polarizing layer in the composite can also have the same characteristics as the inorganic polarizing layer in the display device as described above. For example, the inorganic polarizing layer may include aligned metallic wires within an inorganic transparent matrix, where the aligned metallic wires have a spacing that is effective to polarize light emitted from the inorganic electroluminescent layer. As another example, the inorganic polarizing layer can include carbon nanotubes aligned in an inorganic transparent matrix (e.g., glass).

The composite may also include an inorganic substrate (e.g., first inorganic substrate 105 as depicted in FIG. 1). The inorganic substrate can have the same characteristics as the inorganic the substrate in the display device as described above. For example, the inorganic substrate may be transparent, or in certain configurations, opaque. In some embodiments, the inorganic substrate is glass. The location of the inorganic substrate is not particularly limited. In some embodiments, the inorganic electroluminescent layer is disposed between the inorganic substrate and the inorganic polarizing layer (e.g., as shown in composite 150 of FIG. 1). In some embodiments, the inorganic polarizing layer is disposed between the inorganic electroluminescent layer and the inorganic substrate (e.g., as shown in composite 250 of FIG. 2). In some embodiments, the inorganic substrate is disposed between the inorganic electroluminescent layer and the inorganic polarizing layer (e.g., as shown in composite 350 of FIG. 3).

The composite may also optionally include a reflective layer and/or a scattering layer as discussed above with regard to the display device. For example, the composite can include a scattering layer disposed between the inorganic electroluminescent layer and the inorganic polarizing layer. As another example, the composite has the inorganic electroluminescent layer disposed between a reflective layer and the inorganic polarizing layer.

Some embodiments disclosed herein include a method of making a display device. The method may be used, for example, to prepare any of the display devices disclosed in the present application. The method can include providing a composite, forming an active matrix layer on the composite, and disposing a liquid crystal layer between the composite and a second polarizing layer.

The composite can be any of the composites disclosed in the present application. For example, the composite may include an inorganic electroluminescent layer configured to emit visible light and an inorganic polarizing layer configured to receive light emitted from the inorganic electroluminescent layer. The composite may be, in some embodiments, composite 150, composite 250, or composite 350 as shown in FIGS. 1-3, respectively.

The active matrix layer can be formed on one side of the composite so that the inorganic polarizing layer is disposed between the active matrix layer and the inorganic electroluminescent layer (e.g., inorganic polarizing layer 115 is disposed between active matrix layer 120 and inorganic electroluminescent layer 110 as depicted in FIG. 1). U.S. Pat. Nos. 6,927,087 and 7,517,735 suggest non-limiting examples of suitable procedures for forming the active matrix layer. In some embodiments, forming the active matrix layer comprises chemical vapor deposition or laser annealing. These procedures (and others) can require high temperatures, thus, in some embodiments, forming the active matrix layer comprises heating the composite at a temperature of at least about 300° C. For example, a laser annealing step may heat portions of the composite to about 350° C. or more. The composites disclosed in the present application, in some embodiments, can withstand these high processing temperatures that are typically used to prepare the active matrix layer. Thus, the composite may advantageously allow forming the active matrix layer on the same side of the liquid crystal layer as the inorganic electroluminescent layer.

After forming the active matrix layer on the composite, a liquid crystal layer can be disposed between the active matrix layer and a second polarizing layer. As an example, a first alignment layer can be formed on the active matrix layer and a second alignment layer can be formed on the second polarizing layer. The first alignment layer and second alignment layer may be sealed together and suitable liquid crystal molecules added between the alignment layers. The second polarizing layer and liquid crystal layer can have the same characteristics as discussed above with regard to the display device.

Some embodiments disclosed herein include a method of making a composite. The method may be used, for example, to prepare composite 150 as depicted in FIG. 1. The method can include forming an inorganic electroluminescent layer on an inorganic substrate and forming an inorganic polarizing layer on the inorganic electroluminescent layer.

The inorganic electroluminescent layer may, in some embodiments, be formed by sputtering, electron-beam deposition, printing, or laser deposition. For example, a reflective metal electrode, an inorganic phosphor layer, a p-type semiconductor layer, and a transparent electrode can each be consecutively formed on the inorganic substrate. In some embodiments, a mesh electrode can be formed on the p-type semiconductor layer or the inorganic phosphor layer by photolithography. The inorganic phosphor layer may, in some embodiments, be formed using a printing process by applying an inorganic phosphor with a suitable binder (e.g., polysilane). Japanese Patent Application Publication Number 2009-339924 suggests non-limiting examples of suitable printing processes that may be used to form the inorganic electroluminescent layer.

Forming the inorganic polarizing layer may, in some embodiments, include: applying an inorganic transparent material, or a precursor thereof, the inorganic electroluminescent layer; forming the aligned metallic wires on the inorganic transparent material on the inorganic electroluminescent layer; and applying the inorganic transparent material, or a precursor thereof, on the aligned metallic wires to embed the aligned metallic wires in the inorganic transparent matrix.

Figure 4B:
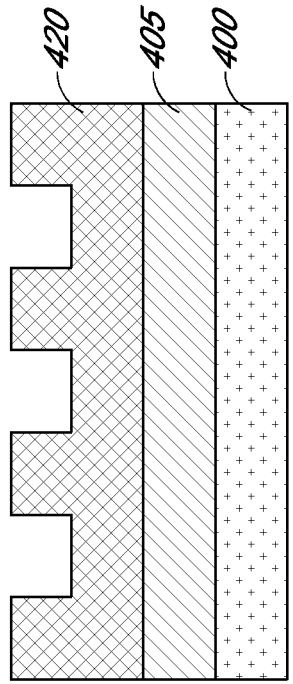
FIG. 4B shows a cross-sectional view of nanostructured layer formed in an example of a process for preparing an inorganic polarizing layer.
Figure 4D:
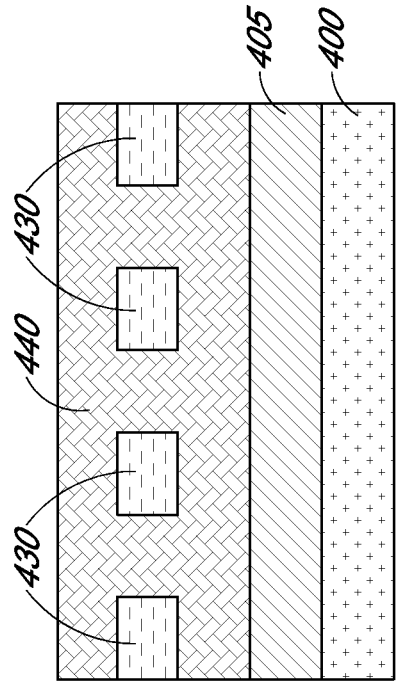
FIG. 4D shows a cross-sectional view of aligned metallic wires embedded in an inorganic transparent material in an example of a process for preparing an inorganic polarizing layer.
Figure 4A:
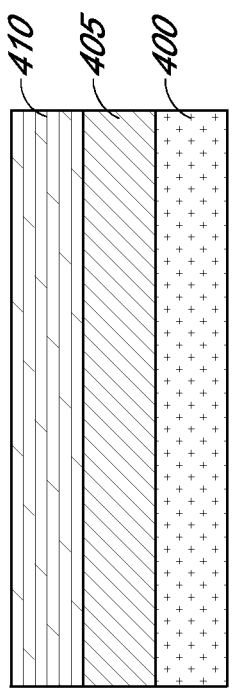
FIG. 4A shows a cross-sectional view of an inorganic transparent material formed in an example of a process for preparing an inorganic polarizing layer.
Figure 4C:
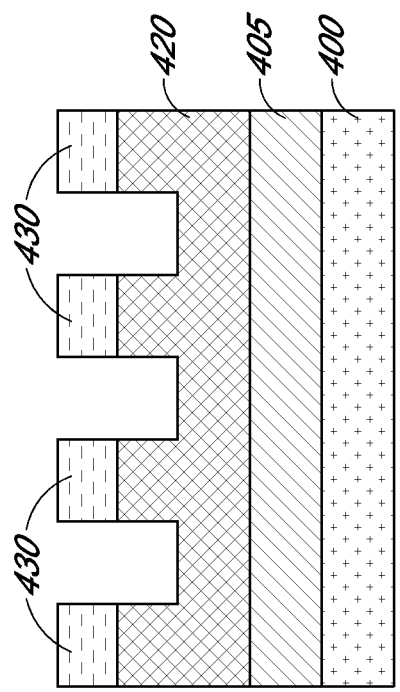
FIG. 4C shows a cross-sectional view of aligned metallic wires formed on the nanostructured layer in an example of a process for preparing an inorganic polarizing layer.

FIGS. 4A-D show a cross-sectional view of one example a method of forming the inorganic polarizing layer. In FIG. 4A, an inorganic transparent material 410, such as polysilane, silazane, siloxane, or spin on glass, is applied to inorganic electroluminescent layer 405 on inorganic substrate 400. An appropriate nanoimprinting mold can be applied to inorganic transparent material 410 to form nanostructured layer 420 having aligned nanostructures as shown in FIG. 4B. This step may optionally include curing the inorganic transparent material using, for example, UV radiation or heating. As a specific example, polysilane can be applied to the electroluminescent layer and a mold applied while exposing the layer to UV radiation. The molded polysilane may also be exposed to $O_2$ plasma and heated to convert the polysilane into silica. At FIG. 4C, oblique vapor deposition of an appropriate metal can form metallic wires 430 having a spacing that corresponds to the pattern in nanostructured layer 420. Japanese Patent Application Publication Number 2011-59370 suggests an example of oblique vapor deposition techniques for forming metallic wires. At FIG. 4D, metallic wires 430 can be embedded in the inorganic transparent material. As an example, polysilane, silazane, siloxane, or spin on glass can be applied by sputtering, and as needed, treated with UV, heat and/or $O_2$ plasma.

The aligned metallic wires may also be formed by appropriate photolithography and/or etching techniques. For example, an inorganic transparent material can be applied, and then a sacrificial layer formed (e.g., by photolithography)

on the inorganic transparent material. The sacrificial layer may have the negative pattern for the aligned metallic wires. An appropriate metal can then be applied to the sacrificial layer and exposed regions of the inorganic transparent material (e.g., by sputtering) and then the aligned metallic wires can be formed by the lift-off method. Japanese Patent No. 4442760 provides a non-limiting example of suitable lift-off procedures for forming a polarizing layer. As another example, a metal film can be formed on the inorganic transparent material and then a patterned mask applied. The metal film can then be etched according the mask pattern to form the aligned metallic wires. U.S. Pat. No. 7,106,507 suggests non-limiting examples of etching procedures for forming a polarizing layer.

The method may also optionally include forming a reflective layer. For example, a metallic reflective layer can be applied to the inorganic substrate by sputtering prior to forming the inorganic electroluminescent layer. The method may also optionally include forming a scattering layer. For example, an inorganic transparent material include silver nanoparticles may be applied by sputtering to the inorganic electroluminescent layer before forming the inorganic polarizing layer.

Some embodiments disclosed herein include a method of making a composite. The method may be used, for example, to prepare composite 250 as depicted in FIG. 2. The method can include forming an inorganic polarizing layer on an inorganic substrate and forming an inorganic electroluminescent layer on the inorganic polarizing layer. Generally, the same procedures described above may be used to prepare the composite, except that that inorganic polarizing layer is disposed between inorganic substrate and the inorganic polarizing layer.

The inorganic polarizing layer can be formed, for example, using a similar nanoimprinting technique to the method shown in FIGS. 4A-D. Rather than applying the inorganic transparent material to inorganic electroluminescent layer 405, the inorganic polarizing layer may be directly applied to inorganic substrate 400. The remaining procedures may remain the same. Alternatively, appropriate etching or lift-off methods may be used to form the aligned metal wires in an inorganic transparent matrix on the inorganic substrate.

The inorganic electroluminescent layer can be formed in the same manner as described above except that inorganic electroluminescent layer can be formed on the inorganic polarizing layer. The method may also optionally include forming a scattering layer and/or a reflective layer in the composite.

Some embodiments disclosed herein include a method of making a composite. The method may be used, for example, to prepare composite 350 as depicted in FIG. 3. The method can include forming an inorganic polarizing layer on a first side of an inorganic substrate and forming an inorganic electroluminescent layer on a second side of the inorganic polarizing layer. Generally, the same procedures described above may be used to prepare the composite, except that that inorganic polarizing layer and inorganic substrate are disposed on opposite sides of the inorganic substrate.

The inorganic polarizing layer can be formed, for example, using a similar nanoimprinting technique to the method shown in FIGS. 4A-D. Rather than apply the inorganic transparent material to inorganic electroluminescent layer 405, the inorganic polarizing layer may be directly applied to inorganic substrate 400. The remaining procedures may remain the same. Alternatively, appropriate etching or lift-off methods may be used to form the aligned metal wires in an inorganic transparent matrix on the inorganic substrate.

The inorganic electroluminescent layer can be formed in the same manner as described above (e.g., by sputtering) except that inorganic electroluminescent layer is formed on a side of the inorganic substrate opposite the inorganic polarizing layer. The inorganic electroluminescent layer can be formed before or after the inorganic polarizing layer is formed.

The method may also optionally include forming a scattering layer and/or a reflective layer in the composite. The scattering layer can be formed on either side of the inorganic glass substrate. That is, the scattering layer can be disposed between the inorganic polarizing layer and the inorganic substrate, or the scattering layer can be disposed between the inorganic electroluminescent layer and the inorganic substrate. In some embodiments, the scattering layer can be formed on the inorganic substrate before forming the inorganic electroluminescent layer. In some embodiments, the scattering layer can be formed on the inorganic substrate before forming the inorganic polarizing layer.

With respect to the use of substantially any plural and/or singular terms herein, those having skill in the art can translate from the plural to the singular and/or from the singular to volume of wastewater can be received in the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

EXAMPLES

Additional embodiments are disclosed in further detail in the following examples, which are not in any way intended to limit the scope of the claims.

Example 1

Forming a Composite

A glass substrate having a thickness of about 0.5 mm is cleaned. An aluminum film having a thickness of about 200 nm is then formed by sputtering on one side of the glass substrate. The aluminum film on the glass substrate can function as both a lower electrode and a reflective film A powdered mixture having $IrO_2$ and ZnS at a molar ratio of $4 \times 10^{-4}$ mole to 1 mole is sputtered on the aluminum film to form an electroluminescent layer having a thickness of about 5 μm. An about 200 nm thick indium tin oxide (ITO) film is then deposited on the electroluminescent layer by sputtering.

A polysilane layer is spin coated on the ITO layer at a thickness of about 2 μm. A mold is pressed on the polysilane layer at a pressure of about 2 MPa to form periodic lines having a width about 60 nm, a depth of about 100 nm, and a periodicity of about 120 nm. The molded polysilane layer is then irradiated with UV radiation, $O_2$ plasma treated, and then heated to vitrify the polysilane layer.

Aluminum is applied to the periodic lines by oblique vapor deposition to form aluminum wires. A polysilane layer is then applied to the aluminum wires by spin coating to form an about 5 μm thick film. The polysilane layer is then irradiated with UV radiation, $O_2$ plasma treated, and then heated to vitrify the polysilane layer. This layer is then planarized to obtain the polarizing layer.

Example 2

Forming a Composite

A glass substrate having a thickness of about 0.5 mm is cleaned. A chromium-molybdenum alloy film having a thickness of about 500 nm is then formed by sputtering on one side of the glass substrate. The chromium-molybdenum alloy film on the glass substrate can function as a reflective film.

A silver film is then applied to the chromium-molybdenum alloy film to form a lower electrode having a thickness of about 50 nm. A powdered mixture having $IrCl_3$, ZnO, and ZnS at a molar ratio of about $4 \times 10^{-4}$ mole to about $2 \times 10^{-4}$ to about 1 mole, respectively, is sputtered on the silver film to form an electroluminescent layer having a thickness of about 2 μm. A $Cu_2S$ film is then sputtered on the electroluminescent layer at a thickness of about 100 nm to form a p-type semiconducting layer. An about 200 nm thick indium tin oxide (ITO) film is then deposited on the p-type semiconducting layer by sputtering.

Curable polysilane is mixed with silver nanoparticles having a diameter from about 40 nm to about 100 nm and $TiO_2$ nanoparticles having a diameter of about 300 nm. The mixture is applied by spin coating to the ITO layer, irradiated with UV radiation, $O_2$ plasma treated, and then heated to vitrify the polysilane. The nanoparticles can be uniformly dispersed in the obtained scattering layer.

A polysilane layer is spin coated on the scattering layer at a thickness of about 2 μm. The polysilane layer is then irradiated with UV radiation, $O_2$ plasma treated, and then heated to vitrify the polysilane layer. A 50 nm thick aluminum film is then sputtered on the vitrified polysilane. A resin mask is formed on the aluminum film by photolithography to form a pattern of lines having a width of about 75 nm and periodicity of about 150 nm. Dry plasma etching is performed to obtain aluminum wires and then the photoresist is removed.

A polysilane layer is then applied to the aluminum wires by spin coating to form an about 5 μm thick film. The polysilane layer is then irradiated with UV radiation, $O_2$ plasma treated, and then heated to vitrify the polysilane layer. This layer is then planarized to obtain the polarizing layer.

Example 3

Forming a Display Device

An amorphous silicon film is formed by chemical vapor deposition on the polarizing layer of the composite obtained in Example 1. The layer is etched to obtain a thin film transistor (TFT) layer. A polyimide layer is then spin coated on the TFT layer and a plurality of grooves formed in the film by rubbing to obtain an alignment layer. A spacer material can be sprayed on the alignment layer to maintain a cell gap distance. These steps resulted in the lower substrate of the display device.

An upper substrate for the display device is obtained by forming a color filtering layer on one side of a glass substrate using photolithography. Then, an epoxy layer is applied as an overcoat.

A polysilane layer is spin coated on the overcoat layer at a thickness of about 2 μm. A mold is pressed on the polysilane layer at a pressure of about 2 MPa to form periodic lines have a width about 60 nm, a depth of about 100 nm, and a periodicity of about 120 nm. The molded polysilane layer is then irradiated with UV radiation, $O_2$ plasma treated, and then heated to vitrify the polysilane layer.

Aluminum is applied to the periodic lines by oblique vapor deposition form aluminum wires. A polysilane layer is then applied to the aluminum wires by spin coating to form an about 5 μm thick film. The polysilane layer is then irradiated with UV radiation, $O_2$ plasma treated, and then heated to vitrify the polysilane layer. This layer is then planarized to obtain the polarizing layer.

An ITO layer is formed by sputtering to obtain a common electrode, and then a polyimide film is applied by spin coating and rubbed to obtain the alignment layer.

A liquid crystal material is added dropwise to the alignment layer on the lower substrate and then upper substrate is brought into contact with lower substrate. The two substrates are pressure bonded using a commercially available vacuum laminating apparatus using a suitable sealant.

Example 4

Forming a Display Device

An amorphous silicon film is formed by chemical vapor deposition on the polarizing layer of the composite obtained in Example 1. The layer is etched to obtain a thin film transistor (TFT) layer. A polyimide layer is then spin coated on the TFT layer and a plurality of groove formed in the film by rubbing to obtain an alignment layer. These steps resulted in the lower substrate of the display device.

An upper substrate for the display device is obtained by forming a color filtering layer on one side of a glass substrate using photolithography. Then, an epoxy layer is applied as an overcoat. A polysilane layer is spin coated on the overcoat layer at a thickness of about 2 μm. A mold is pressed on the polysilane layer at a pressure of about 2 MPa to form periodic lines have a width about 60 nm, a depth of about 100 nm, and a periodicity of about 120 nm. The molded polysilane layer is then irradiated with UV radiation, $O_2$ plasma treated, and then heated to vitrify the polysilane layer.

Aluminum is applied to the periodic lines by oblique vapor deposition form aluminum wires. A polysilane layer is then applied to the aluminum wires by spin coating to form an about 5 μm thick film. The polysilane layer is then irradiated with UV radiation, $O_2$ plasma treated, and then heated to vitrify the polysilane layer. This layer is then planarized to obtain the polarizing layer.

An ITO layer is formed by sputtering to obtain a common electrode on the polarizing layer. A polyimide film is applied by spin coating and rubbed to obtain the alignment layer for the upper substrate.

A liquid crystal material is added dropwise to the alignment layer on the lower substrate and then upper substrate is brought into contact with lower substrate. The two substrates are pressure bonded using a commercially available vacuum laminating apparatus using a suitable sealant.

What is claimed is:

1. A display device comprising:
   an inorganic substrate and a transparent substrate;
   an inorganic electroluminescent layer configured to emit visible light;
   an active matrix layer;
   an inorganic polarizing layer disposed between the inorganic electroluminescent layer and the active matrix layer;
   a liquid crystal layer, wherein the active matrix layer is disposed between the liquid crystal layer and the inorganic polarizing layer; and
   a color filtering layer,
   wherein the transparent substrate, the color filtering layer, the liquid crystal layer, the active matrix layer, the inorganic polarizing layer, the inorganic electroluminescent layer and the inorganic substrate are formed in that order, such that the inorganic electroluminescent layer serves as backlight providing lighting for the liquid crystal layer.

2. The display device of claim 1, further comprising a reflective layer configured to reflect light emitted from the electroluminescent layer, wherein the inorganic electroluminescent layer is disposed between the reflective layer and the inorganic polarizing layer.

3. The display device of claim 2, wherein the reflective layer is metallic.

4. The display device of claim 1, wherein the inorganic electroluminescent layer comprises:
   a first electrode;
   a p-type semiconductor layer;
   an inorganic phosphor layer disposed between the p-type semiconductor layer and the first electrode; and
   a second electrode, wherein the p-type semiconductor layer is disposed between the inorganic phosphor layer and the second electrode.

5. The display device of claim 4, wherein the first electrode is configured to reflect light emitted from the inorganic phosphor layer.

6. The display device of claim 4, wherein the second electrode is transparent.

7. The display device of claim 4, wherein the first electrode comprises a metallic mesh.

8. The display device of claim 1, wherein the inorganic polarizing layer is a multi-layered laminate.

9. The display device of claim 1, further comprising a second polarizing layer, wherein the liquid crystal layer is disposed between the second polarizing layer and the inorganic polarizing layer.

10. The display device of claim 1, wherein the liquid crystal layer is disposed between the color filtering layer and inorganic electroluminescent layer.

11. A method of making a display device, the method comprising:
- providing a composite comprising:
- an inorganic substrate;
- an inorganic electroluminescent layer configured to emit visible light; and
- an inorganic polarizing layer configured to receive light emitted from the inorganic electroluminescent layer, wherein the inorganic polarizing layer comprises aligned metallic wires within an inorganic transparent matrix, the aligned metallic wires having a spacing that is effective to polarize light emitted from the inorganic electroluminescent layer;
- forming an active matrix layer on the composite;
- disposing a liquid crystal layer between the composite and a second polarizing layer; and
- providing a transparent substrate, wherein the transparent substrate, the second polarizing layer, the liquid crystal layer, the active matrix layer, the inorganic polarizing layer, the inorganic electroluminescent layer and the inorganic substrate are formed in that order, such that the inorganic electroluminescent layer serves as backlight providing lighting for the liquid crystal layer.

12. The method of claim 11, wherein forming the active matrix layer comprises chemical vapor deposition or laser annealing.

13. The method of claim 11, wherein forming the active matrix layer comprises heating the composite at a temperature of at least about 300° C.

* * * * *